(12) United States Patent
Yu

(10) Patent No.: US 6,708,536 B1
(45) Date of Patent: Mar. 23, 2004

(54) ANTI-THEFT DEVICE FOR VEHICLES

(76) Inventor: Chia Yu Yu, P.O. Box 63-99, Taichung (TW), 406

( * ) Notice: Subject to any disclaimer, the term of this patent is extended or adjusted under 35 U.S.C. 154(b) by 0 days.

(21) Appl. No.: 10/400,947

(22) Filed: Mar. 25, 2003

(51) Int. Cl.[7] .............................................. B60R 25/06
(52) U.S. Cl. ............................. 70/199; 70/202; 70/238; 70/247
(58) Field of Search ..................... 70/237, 238, DIG. 9, 70/198–203, 254, 209, 245–248

(56) References Cited

U.S. PATENT DOCUMENTS

| | | | |
|---|---|---|---|
| 1,368,117 A | * | 2/1921 | Claude |
| 4,835,999 A | | 6/1989 | Chant ........................... 70/238 |
| 5,673,575 A | * | 10/1997 | Carlo et al. .................... 70/209 |
| 5,673,576 A | * | 10/1997 | Chen et al. .................... 70/199 |
| 5,820,287 A | * | 10/1998 | Bartlett et al. ................. 403/84 |
| 5,950,463 A | * | 9/1999 | Glazier et al. ................. 70/202 |
| 6,568,032 B1 | * | 5/2003 | Ramsauer ...................... 16/329 |

FOREIGN PATENT DOCUMENTS

GB  2142889 A  1/1985

* cited by examiner

*Primary Examiner*—Lloyd A. Gall

(57) ABSTRACT

An anti-theft device includes a barrel for attaching onto a gear-shift lever and having a seat, a follower, a latch device for attaching to parking brake and having a conduit to slidably receive the rod, and a lock member secured to the conduit to selectively lock the rod to the conduit. The rod has one end rotatably secured in the follower. A fastener is engaged through the barrel and threaded with the follower, to secure the follower to the seat. The rod may be rotated relative to the conduit, and the follower may be rotated relative to the seat, such that the latch device may be easily attached onto the parking brake.

9 Claims, 6 Drawing Sheets

ANTI-THEFT DEVICE FOR VEHICLES

BACKGROUND OF THE INVENTION

1. Field of the Invention

The present invention relates to an anti-theft device, and more particularly to an anti-theft device for being attached between the parking brake and the gearshift lever, and for preventing both the parking brake and the gearshift lever from being actuated by unauthorized persons.

2. Description of the Prior Art

Various kinds of typical anti-theft devices have been developed for being attached to either of the parking brake, the gear-shift lever, or the steering wheel, for preventing either of the parking brake, the gear-shift lever or the steering wheel from being actuated by unauthorized persons. However, most of the typical anti-theft devices are provided for attaching onto the steering wheel, and for preventing only the steering wheel from being actuated by unauthorized persons.

UK Patent No. GB2142889A to Turner et al., and U.S. Pat. No. 4,835,999 to Chant disclose two of the other typical anti-theft devices, and provided for being attached between the parking brake and the gear-shift lever, and for preventing both the parking brake and the gear-shift lever from being actuated by unauthorized persons. However, the typical anti-theft devices comprise an extension rotatably attached to a hollow body with a pivot shaft, for allowing the extension to be rotated relative to the hollow body in one direction only. The extensions of the typical anti-theft devices may not be freely rotated relative to the hollow body in the other directions.

The present invention has arisen to mitigate and/or obviate the afore-described disadvantages of the conventional anti-theft. devices.

SUMMARY OF THE INVENTION

The primary objective of the present invention is to provide an anti-theft device for being easily attached between the parking brake and the gearshift lever, and for preventing the parking brake and the gear-shift lever from being actuated by unauthorized persons.

In accordance with one aspect of the invention, there is provided an anti-theft device for being attached between a parking brake and a gear-shift lever of a vehicle, the anti-theft device comprising a barrel for attaching onto the gear-shift lever, the barrel including a seat provided thereon and having an aperture formed therein, and a follower including a first end facing toward the seat and including a cavity formed therein. A latch device is provided for attaching onto the parking brake, and includes a conduit having a hole formed therein, a rod slidably received in the hole of the conduit, and a lock member secured to the conduit to selectively lock the rod to the conduit. The rod includes a first end rotatably secured in the cavity of the follower, to allow the rod to be rotated and adjusted relative to the follower, and a fastener is engaged through the aperture of the barrel, and threaded with the follower, to secure the follower to the seat after the follower is rotated and adjusted relative to the seat. The rod may be rotated relative to the conduit, and the follower may be rotated relative to the seat, such that the latch device may be easily attached onto the parking brake.

The latch device includes an extension secured to the lock member, and a tube secured to the extension and having a bore aligned with the hole of the conduit to slidably receive the rod, and an elbow secured to the tube and to form a lock notch between the tube and the elbow, to receive the parking brake. The latch device further includes a fastener engaged through the extension and the elbow to secure the elbow to the extension. The rod includes a plurality of teeth provided thereon.

The seat includes a plurality of teeth provided thereon and arranged around the aperture thereof, the follower includes a plurality of teeth provided thereon and arranged to be engaged with the teeth of the seat, and to solidly secure the follower to the seat when the follower is forced to the seat with the fastener. A spring biasing device may further be provided to bias the teeth of the follower to engage with the teeth of the seat.

The follower includes a bore formed therein, a lock nut secured in the bore of the follower and threaded with the fastener, to secure the follower to the seat. The follower includes a cap attached thereto, to block the bore thereof. The follower includes a plate attached thereto for applying marks onto the plate, for example.

The first end of the rod includes a protrusion extended therefrom and having an annular groove formed therein, and the follower includes a stop pin engaged through the follower and engaged into the annular groove of the protrusion of the rod, to rotatably secure the rod to the follower.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
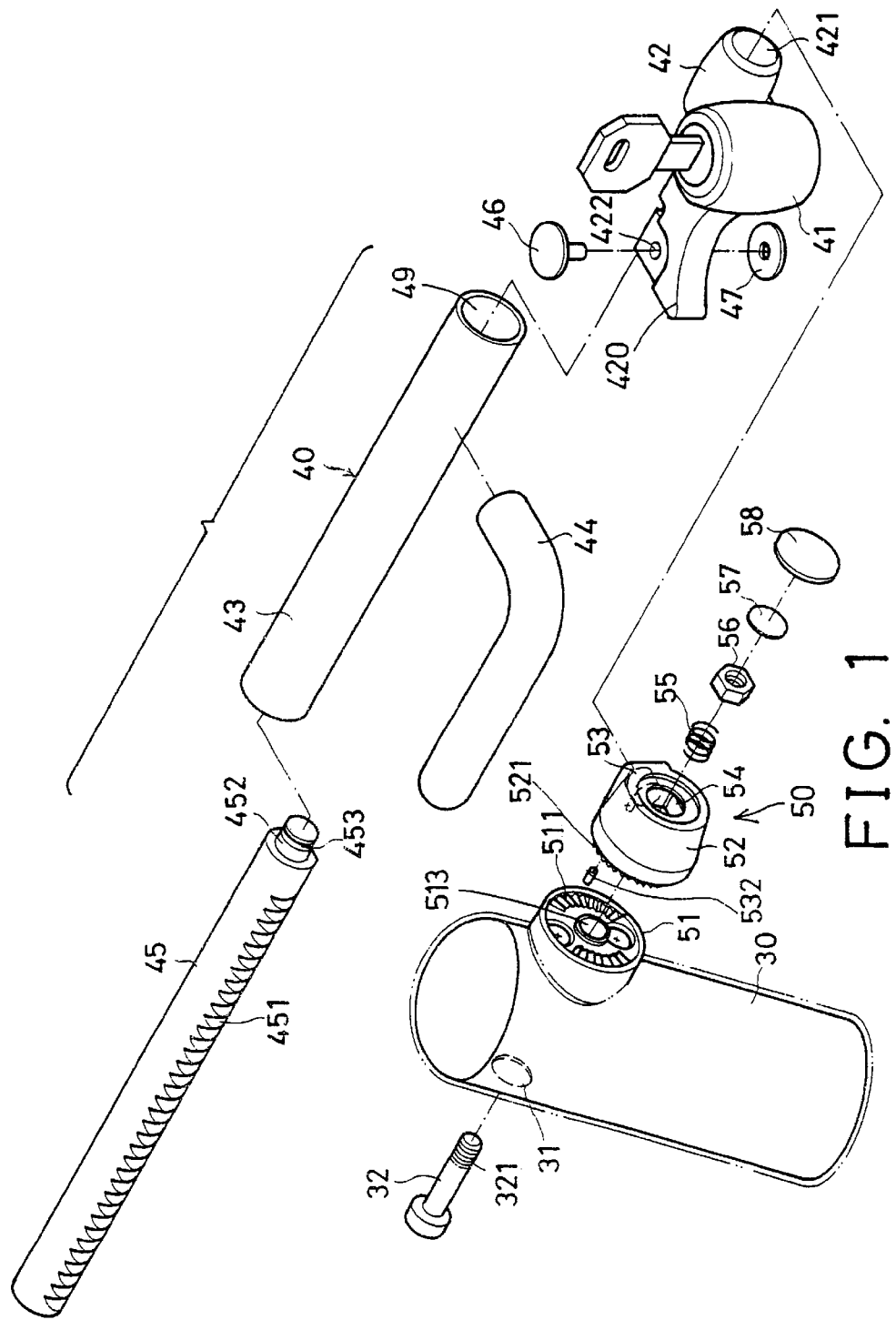
FIG. 1 is an exploded view of an anti-theft device in accordance with the present invention.
Figure 2:
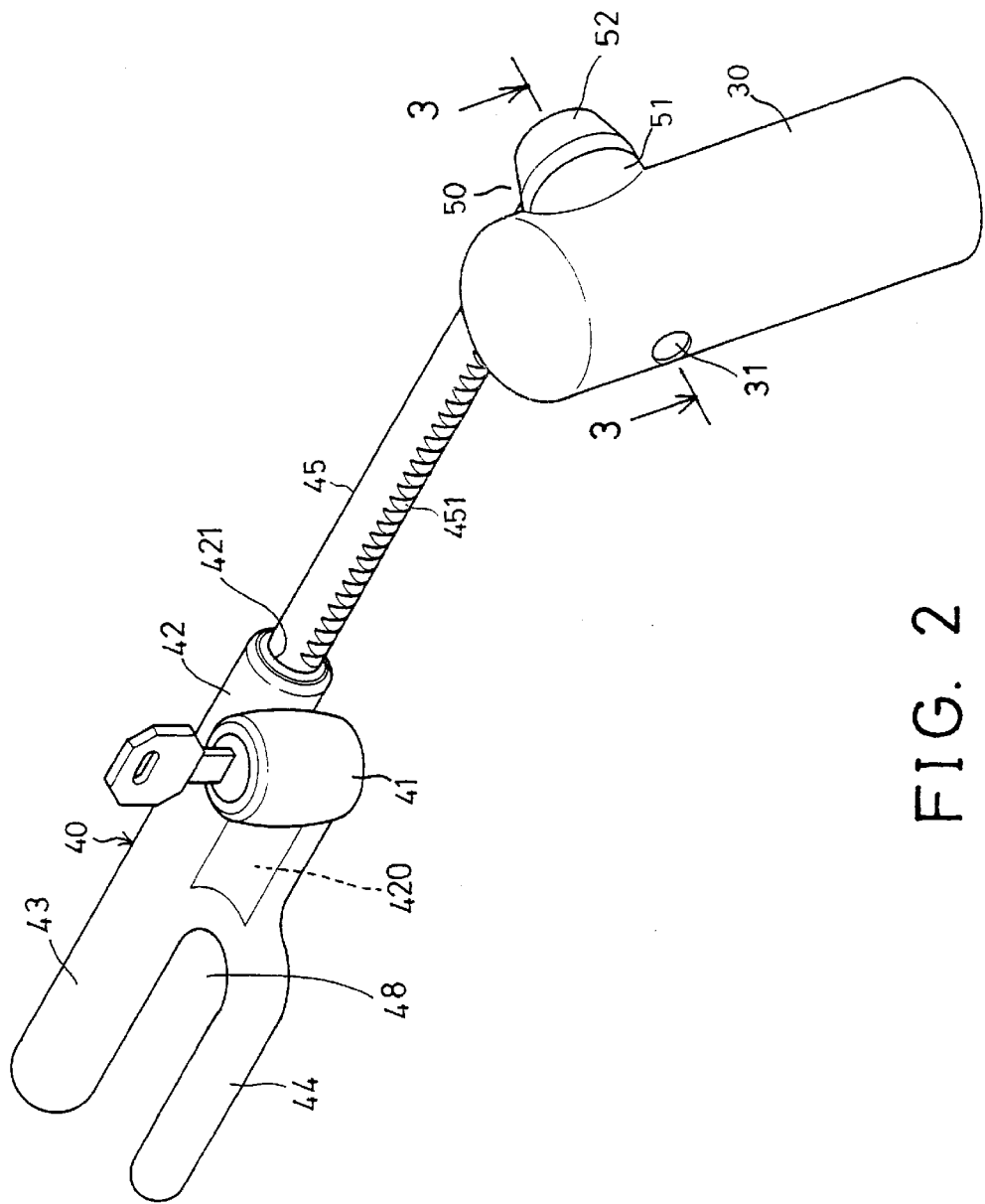
FIG. 2 is a perspective view of the anti-theft device.
Figure 3:
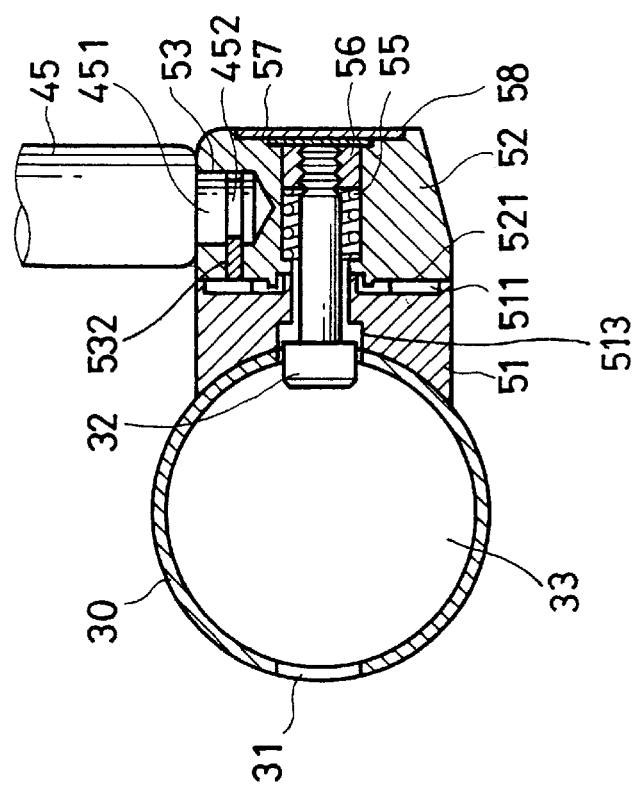
FIG. 3 is a cross sectional view of the anti-theft device, taken along lines 3—3 of FIG. 2.

Referring to the drawings, and initially to FIGS. 1–3, an anti-theft device in accordance with the present invention comprises a hollow barrel 30 including a chamber 33 formed therein (FIG. 3) to receive the parking brake 1 (FIG. 6), and thus for allowing the barrel 30 to be attached onto the parking brake 1. The barrel 30 includes an orifice 31 formed therein and communicating with the chamber 33 thereof, for receiving a fastener 32 that has a threaded portion or an outer thread 321 provided and formed thereon.

A latch device 40 is provided for being attached or hooked onto the gear-shift lever 2 (FIG. 6), and to be coupled to the barrel 30, and thus for being attached between the parking brake 1 and the gear-shift lever 2, in order to prevent both the parking brake 1 and the gear-shift lever 2 from being actuated by unauthorized persons. The latch device 40 includes a tube 43 and an L-shaped elbow 44 secured to the tube 43, in order to form a U-shaped latch member (FIGS. 2 and 4–6), and so as to form and define a lock notch 48 therein, and to receive or hook the gear-shift lever 2. The tube 43 includes a bore 49 formed therein (FIG. 1).

The latch device 40 further includes a lock member 41 attached or secured to a conduit 42 which is aligned with the tube 43 and which includes a hole 421 formed therein and aligned with the bore 49 of the tube 43. A rod 45 is slidably received in the bore 49 of the tube 43 and the hole 421 of the conduit 42, and includes a rack or a plurality of teeth 451 formed thereon, and includes a protrusion 452 extended from the other end thereof, and having an annular groove 453 formed therein. The rod 45 may be selectively or adjustably secured to the tube 43 and the conduit 42 with the lock member 41 which is typical and will not be described in further details.

A rivet or fastener 46 may further be provided and engaged through the aperture 422 of the extension 420 and engaged through the tube 43 or the elbow 44, and a washer 47 attached to the fastener 46. The extension 420 and/or the fastener 46 of the latch device 40 may further be solidly secured to the tube 43 or the elbow 44 by such as welding processes, for allowing the lock member 41 and the conduit 42 and the tube 43 and the elbow 44 and the fastener 46 to be solidly secured together to form a one-integral-piece member (FIGS. 1, 2 and 4–6).

A coupler device 50 includes a seat 51 formed or provided or secured on the barrel 30, and includes an aperture 513 formed therein and aligned with the orifice 31 of the barrel 30, to receive the fastener 32 therein. The seat 51 further includes a serrated surface or a number of teeth 511 formed therein, and preferably provided or arranged around the aperture 513 thereof.

The coupler device 50 further includes a follower 52 having a cavity 53 formed therein (FIGS. 1, 3), to rotatably receive the protrusion 452 of the rod 45. A stop pin 532 is engaged through the follower 52 and engaged into the annular groove 453 of the protrusion 452 of the rod 45 (FIG. 3), to rotatably secure the protrusion 452 of the rod 45 to the follower 52, and for allowing the rod 45 and thus the tube 43 and the elbow 44 of the latch device 40 to be rotated relative to the follower 52.

The follower 52 includes a bore 54, such as a non-circular or hexagonal bore 54 formed therein, and includes a serrated surface or a number of teeth 521 formed on one end thereof, and preferably provided or arranged around the bore 54 thereof, and facing toward the teeth 511 of the seat 51, for being engaged with the teeth 511 of the seat 51.

A lock nut 56 is engaged in the non-circular or hexagonal bore 54 of the follower 52, such that the lock nut 56 may be stably retained in the bore 54 of the follower 52, and may not be rotated relative to the follower 52. The outer thread 321 of the fastener 32 may be threaded with the lock nut 56 in order to solidly secure the follower 52 to the seat 51. The follower 52 may also be rotated or adjusted relative to the seat 51 when the fastener 32 is unthreaded relative to the lock nut 56.

A spring member 55 may further be provided and engaged onto the fastener 32, or biased between the follower 52 and the lock nut 56 or the fastener 32, for biasing the teeth 521 of the follower 52 to engage with the teeth 511 of the seat 51, and for allowing the follower 52 to be rotated relative to the seat 51 stepwise by the engagement between the teeth 521 of the follower 52 and the teeth 511 of the seat 51. A cap 57 may be attached to the follower 52 to seal or block the bore 54 of the follower 52. A plate 58 may further be provided and attached to the follower 52, for applying marks or the like thereon.

Figure 4:
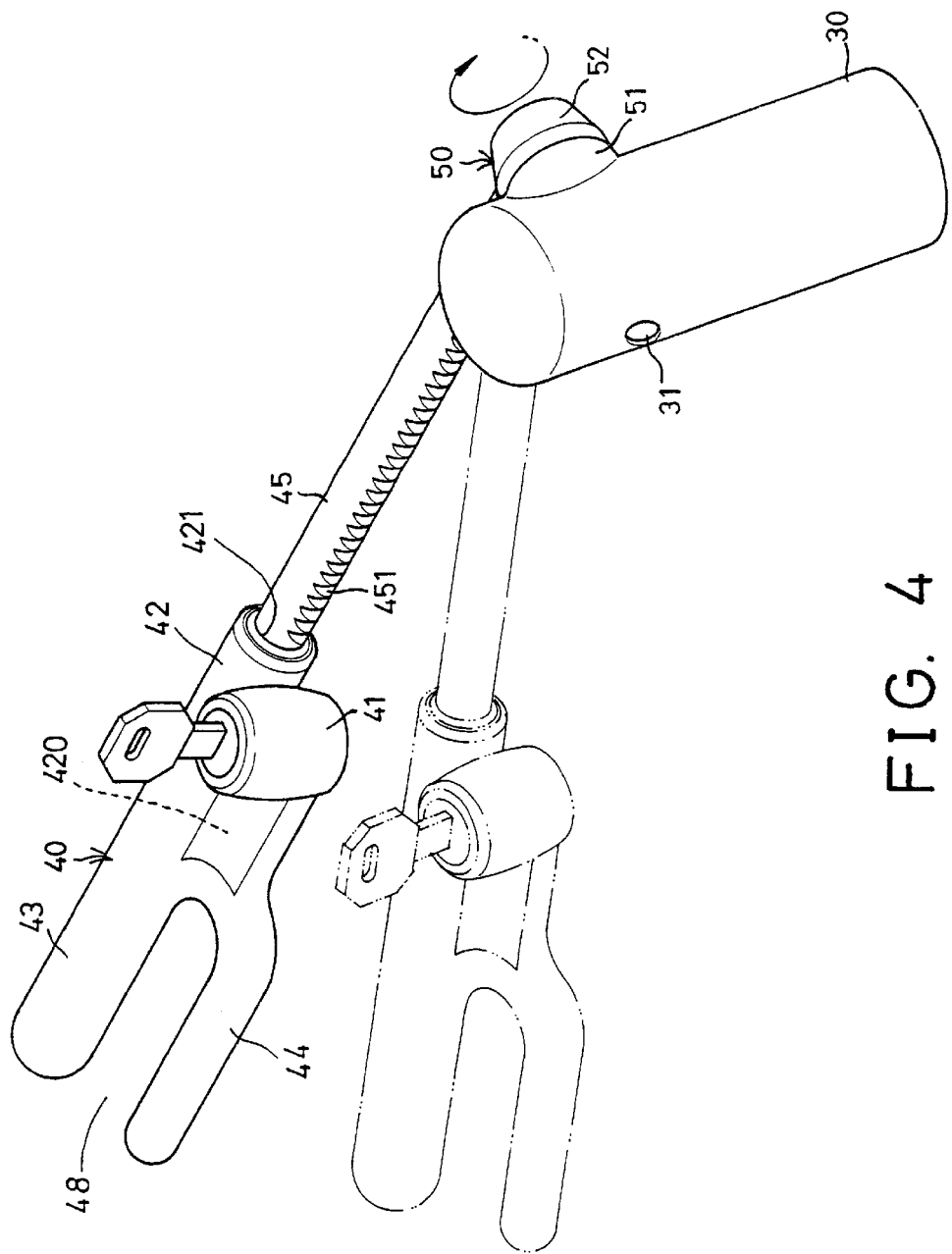
FIGS. 4, 5, 6 are perspective views illustrating the operation of the anti-theft device.
Figure 5:
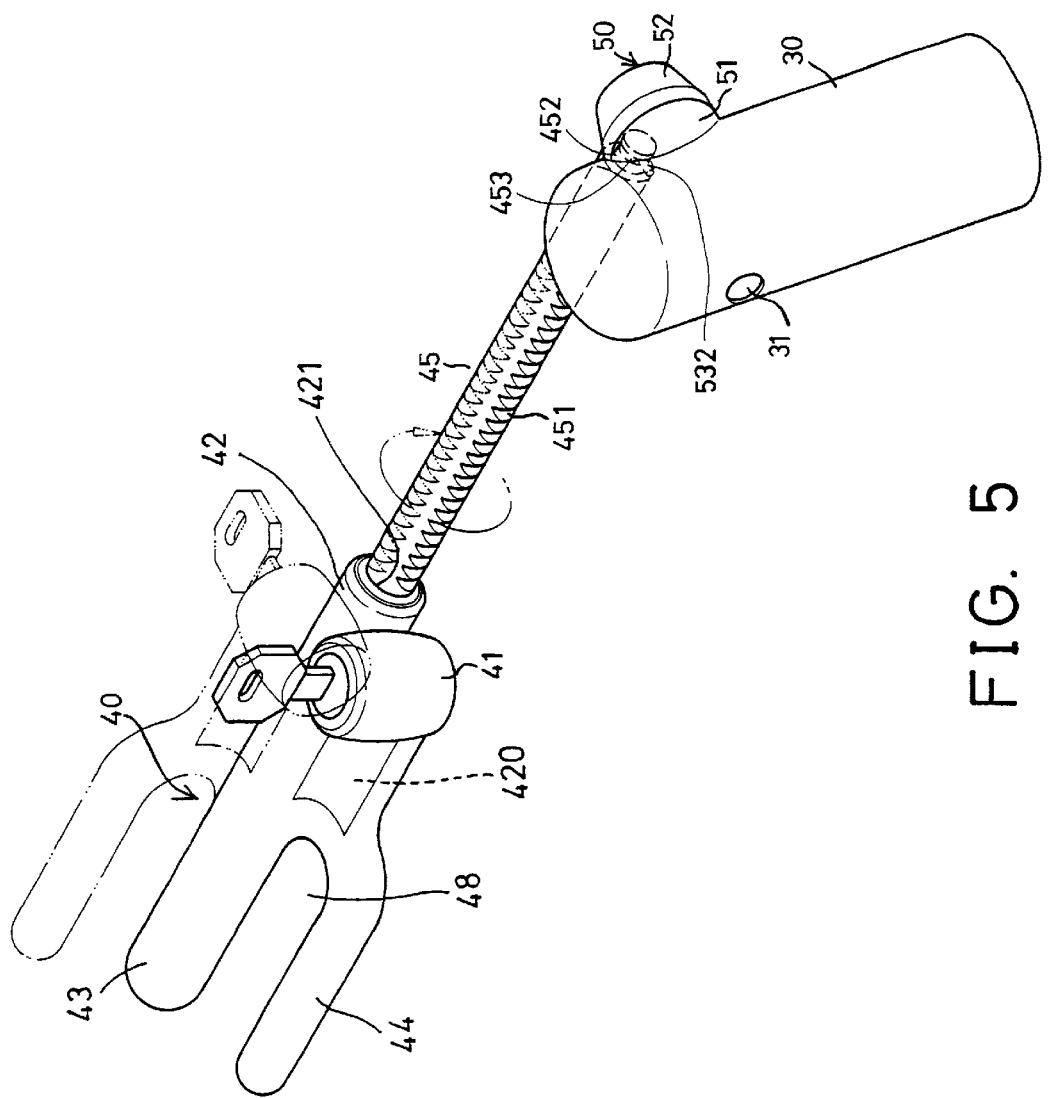
Figure 6:
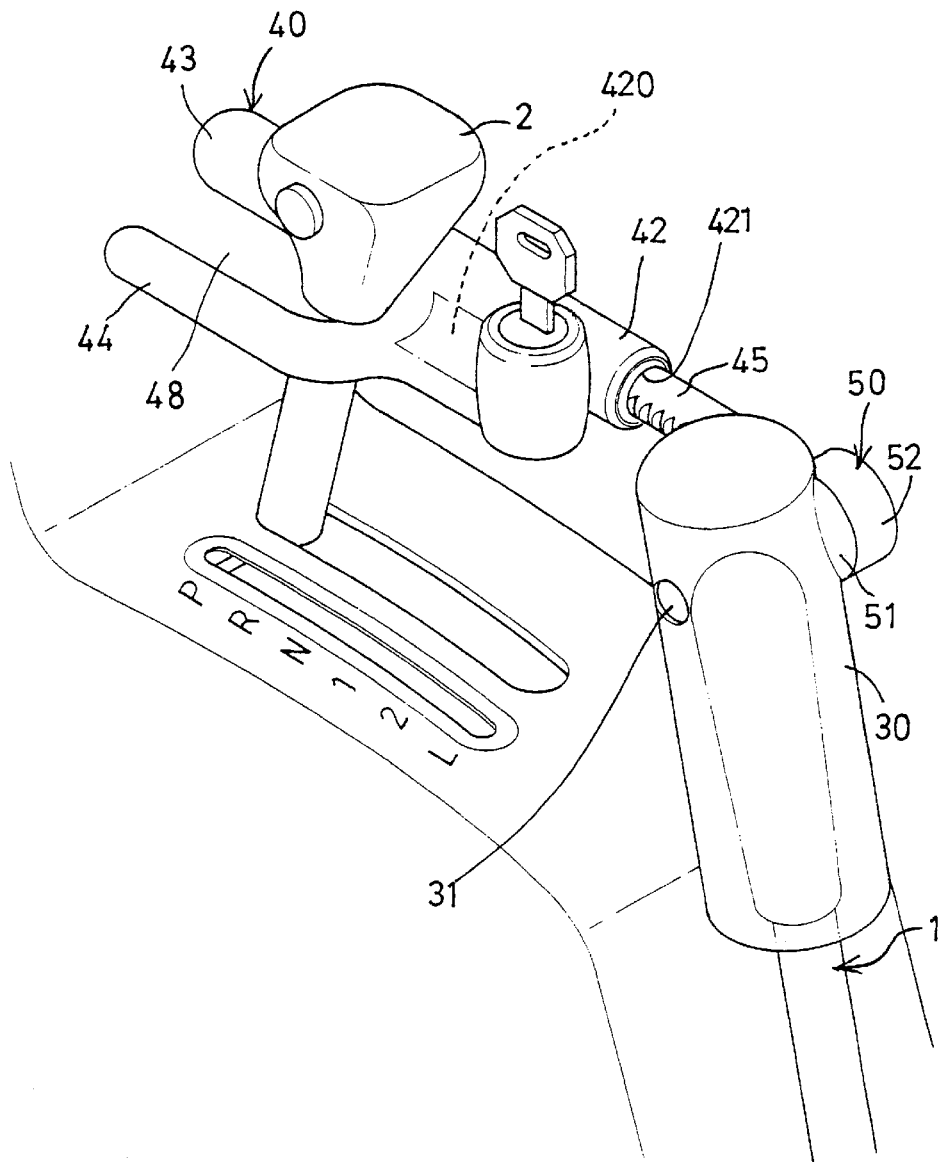

In operation, as shown in FIG. 5, the tube 43 and the elbow 44 and the rod 45 of the latch device 40 may be rotated relative to the follower 52 by the rotational engagement of the protrusion 452 of the rod 45 in the cavity 53 of the follower 52. In addition, as shown in FIG. 4, the rod 45 of the latch device 40 and the follower 52 may be rotated relative to the seat 51 or the barrel 30 by the rotational engagement of the follower 52 to the seat 51, such that the tube 43 and the elbow 44 of the latch device 40 may be easily adjusted relative to the barrel 30, and may be easily attached onto the gear-shift lever 2 (FIG. 6).

Accordingly, the anti-theft device in accordance with the present invention may be easily attached between the parking brake and the gear-shift lever, in order to prevent both the parking brake and the gear-shift lever from being actuated by unauthorized persons.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An anti-theft device for being attached between a parking brake and a gear-shift lever of a vehicle, said anti-theft device comprising:
   a barrel for attaching onto the parking brake, said barrel including a seat provided thereon and having an aperture formed therein,
   a follower including a first end facing toward said seat, and including a cavity formed therein,
   a latch device for attaching onto the gear-shift lever, and including a conduit having a hole formed therein, a rod slidably received in said hole of said conduit, a lock member secured to said conduit to selectively lock said rod to said conduit, said rod including a first end rotatably secured in said cavity of said follower, to allow said rod to be rotated and adjusted relative to said follower, said latch device including an extension secured to said lock member, and a tube secured to said extension and having a bore aligned with said hole of said conduit to slidably receive said rod, and an elbow secured to said tube and to form a lock notch between said tube and said elbow, to receive the gear-shift lever, and
   a fastener engaged through said aperture of said barrel, and threaded with said follower, to secure said follower to said seat after said follower is rotated and adjusted relative to said seat.

2. The anti-theft device as claimed in claim 1, wherein said latch device further includes a fastener engaged through said extension and said elbow to secure said elbow to said extension.

3. The anti-theft device as claimed in claim 1, wherein said rod includes a plurality of teeth provided thereon.

4. The anti-theft device as claimed in claim 1, wherein said follower includes a bore formed therein, a lock nut secured in said bore of said follower and threaded with said fastener, to secure said follower to said seat.

5. The anti-theft device as claimed in claim 4, wherein said follower includes a cap attached thereto, to block said bore thereof.

6. The anti-theft device as claimed in claim 4, wherein said follower includes a plate attached thereto.

7. The anti-theft device as claimed in claim 1, wherein said first end of said rod includes a protrusion extended therefrom and having an annular groove formed therein, and said follower includes a stop pin engaged through said follower and engaged into said annular groove of said protrusion of said rod, to rotatably secure said rod to said follower.

8. An anti-theft device for being attached between a parking brake and a gear-shift lever of a vehicle, said anti-theft device comprising:
- a barrel for attaching onto the parking brake, said barrel including a seat provided thereon and having an aperture formed therein, said seat including a plurality of teeth provided thereon and arranged around said aperture thereof,
- a follower including a first end facing toward said seat, and including a cavity formed therein, said follower including a plurality of teeth provided thereon and arranged to be engaged with said teeth of said seat,
- a latch device for attaching onto the gear-shift lever, and including a conduit having a hole formed therein, a rod slidably received in said hole of said conduit, a lock member secured to said conduit to selectively lock said rod to said conduit, said rod including a first end rotatably secured in said cavity of said follower, to allow said rod to be rotated and adjusted relative to said follower, and
- a fastener engaged through said aperture of said barrel, and threaded with said follower, to secure said follower to said seat after said follower is rotated and adjusted relative to said seat, said teeth of said follower being engaged with said teeth of said seat, and to solidly secure said follower to said seat when said follower is forced to said seat with said fastener.

9. The anti-theft device as claimed in claim 8 further comprising means for biasing said teeth of said follower to engage with said teeth of said seat.

* * * * *